(12) United States Patent
Terauchi et al.

(10) Patent No.: US 10,027,894 B2
(45) Date of Patent: Jul. 17, 2018

(54) PHOTOGRAPHING APPARATUS

(71) Applicant: RICOH IMAGING COMPANY, LTD., Tokyo (JP)

(72) Inventors: Masakazu Terauchi, Tochigi (JP); Masashi Miyata, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 338 days.

(21) Appl. No.: 14/765,666

(22) PCT Filed: Feb. 12, 2014

(86) PCT No.: PCT/JP2014/053106
§ 371 (c)(1),
(2) Date: Aug. 4, 2015

(87) PCT Pub. No.: WO2014/126074
PCT Pub. Date: Aug. 21, 2014

(65) Prior Publication Data
US 2015/0381894 A1    Dec. 31, 2015

(30) Foreign Application Priority Data
Feb. 13, 2013 (JP) ................. 2013-025592

(51) Int. Cl.
*G03B 17/00* (2006.01)
*H04N 5/228* (2006.01)
(Continued)

(52) U.S. Cl.
CPC ....... *H04N 5/23287* (2013.01); *H04N 5/2176* (2013.01); *H04N 5/2253* (2013.01);
(Continued)

(58) Field of Classification Search
CPC ............ G02B 27/646; G03B 2207/005; H04N 5/353–5/3537;
(Continued)

(56) References Cited

U.S. PATENT DOCUMENTS

| | | | |
|---|---|---|---|
| 6,587,148 B1 | 7/2003 | Takeda et al. | |
| 2001/0048474 A1* | 12/2001 | Yamazaki | H04N 5/23212 348/207.99 |

(Continued)

FOREIGN PATENT DOCUMENTS

| | | |
|---|---|---|
| JP | 08-114769 | 5/1996 |
| JP | 09-083858 | 3/1997 |

(Continued)

OTHER PUBLICATIONS

Search Report issued in World Intellectual Property Organization Counterpart Patent Appl. No. PCT/JP2014/053106, dated Apr. 8, 2014.

*Primary Examiner* — Xi Wang
(74) *Attorney, Agent, or Firm* — Greenblum & Bernstein, P.L.C.

(57) ABSTRACT

A photographing apparatus includes a photographing optical system having a diaphragm and a photographing lens; an image sensor; a driver which drives a shake-correction member in a plane orthogonal to the optical axis to make the object-emanating light rays incident on pixels of the image sensor that have different in detection colors to obtain an optical low-pass filter effect, wherein the image sensor and/or a lens element-constitutes the shake-correction member; a retriever which retrieves information on an aperture diameter of the diaphragm and on a resolving power of the photographing lens; and a drive controller which varies a range of the pixels, having different detection colors and on which the object-emanating light rays are incident, in accordance with the information on the aperture diameter of the (Continued)

diaphragm and/or on the resolving power of the photographing lens to vary the optical low-pass filter effect.

20 Claims, 7 Drawing Sheets

(51) Int. Cl.
*H04N 5/335* (2011.01)
*H04N 5/232* (2006.01)
*H04N 5/217* (2011.01)
*H04N 5/225* (2006.01)
*H04N 5/238* (2006.01)
*H04N 9/07* (2006.01)
*H04N 101/00* (2006.01)

(52) U.S. Cl.
CPC ......... *H04N 5/238* (2013.01); *H04N 5/23248* (2013.01); *H04N 5/23258* (2013.01); *H04N 9/07* (2013.01); *H04N 2101/00* (2013.01)

(58) Field of Classification Search
CPC ................ H04N 2209/045–2209/046; H04N 5/23248–5/2329; H01L 27/14621; G06T 7/38

USPC ................ 359/554–557; 396/52–55, 13; 348/208.99, 219.1, 273–283

See application file for complete search history.

(56) References Cited

U.S. PATENT DOCUMENTS

| | | | | |
|---|---|---|---|---|
| 2009/0015707 | A1* | 1/2009 | Hibino | G03B 7/093 348/347 |
| 2010/0079825 | A1* | 4/2010 | Yamazaki | G02B 27/46 358/474 |
| 2012/0268642 | A1* | 10/2012 | Kawai | G02B 27/646 348/335 |
| 2015/0381894 | A1* | 12/2015 | Terauchi | H04N 5/23248 348/208.7 |

FOREIGN PATENT DOCUMENTS

| | | |
|---|---|---|
| JP | 09-116910 | 5/1997 |
| JP | 3195950 | 6/2001 |
| JP | 2003-167123 | 6/2003 |
| JP | 2007-097049 | 4/2007 |
| JP | 2008-035241 | 2/2008 |

\* cited by examiner

Intensity Distribution of Two Point Light Sources
(Rayleigh Criterion for Resolution)

(B)

Relationship Between Diaphragm and
Rayleigh Criterion for Resolution

Fig. 5

MTF Curves
(Graphed by Aperture value)

MTF Curves
(Graphed by Number of Lines)

PHOTOGRAPHING APPARATUS

TECHNICAL FIELD

The present invention relates to a photographing apparatus capable of obtaining an optical low-pass filter effect without the use of an optical low-pass filter.

BACKGROUND ART

Image sensors (image pickup devices) for use in photographing apparatuses such as digital still cameras, digital video cameras, or the like, sometimes create moiré and false color, etc., that do not originally exist on an object if light rays emanating from the object contain components of spatial frequency that exceeds the limit spatial frequency of the image sensor. To reduce the occurrence of such phenomena, an optical low-pass filter is conventionally used. On the other hand, if an optical low-pass filter is used, resolving power, a sense of resolution and contrast deteriorate.

Whereas, an optical low-pass filter (Patent Literature 1) and a digital camera (Patent Literature 2) have been proposed as technologies for preventing moiré and false color, etc., from occurring without the use of a low-pass filter. The optical low-pass filter is provided with an variable apex-angle prism which is disposed in a photographing optical system and an exciting driver which excites and drives the variable apex-angle prism to vary the direction of object-emanating light rays which emerge from the variable apex-angle prism, wherein the optical low-pass filter is capable of obtaining optical low-pass filter effect by varying the direction of the object-emanating light rays by exciting the variable apex-angle prism, and the digital camera obtains an optical low-pass filter effect by receiving the object-emanating light rays via a plurality of pixels while moving an image sensor along a predetermined path.

CITATION LIST

Patent Literature

Patent Literature 1: Japanese Unexamined Patent Publication No. H04-092579
Patent Literature 2: Japanese Unexamined Patent Publication No. 2008-35241

SUMMARY OF THE INVENTION

Technical Problem

It is desirable that the low-pass filter effect be strong (great) when the diaphragm is open or when the resolving power (MTF/limit spatial frequency) of the photographic lens is high; conversely, it is desirable that the low-pass filter effect be weak (small)(or be made non-effective) when the diaphragm is stopped down or when the resolving power of the photographic lens is low. However, in conventional low-pass filters and digital cameras, it has been difficult to obtain an optimum low-pass filter effect that is flexibly responsive to variations in photographic conditions such as the resolving power of a photographic lens when the photographing conditions varies.

In view of the above described problem, an object of the present invention is to provide a photographing apparatus (having the capability of adjusting limit spatial frequency and the capability of limiting frequency band) which can obtain an appropriate optical low-pass filter effect in accordance with the photographic conditions without the use of an optical low-pass filter.

Solution to Problem

In photographing apparatuses equipped with an image-shake correcting apparatus which oscillates an image sensor to correct (compensate for) image shake, the present invention has been completed based on the findings that moving (oscillating) the image sensor along a predetermined path during an exposure causes the limit spatial frequency to decrease, to thereby make it possible to obtain a low-pass filter effect equivalent to that of an optical low-pass filter and that at least one of information on the aperture diameter of a diaphragm contained in a photographing optical system and information on resolving power of the photographic lens is used to achieve variable control of the optical low-pass filter effect.

Specifically, the present invention is characterized by a photographing apparatus, including a photographing optical system having at least a diaphragm and a photographing lens; an image sensor, to which an object image that is formed from object-emanating light rays passed through the photographing optical system is exposed, and which converts the object image thus exposed into an electrical pixel signal; a driver which drives a shake-correction member in a plane orthogonal to an optical axis of the photographing optical system to make the object-emanating light rays incident on a plurality of pixels of the image sensor which are mutually different in detection color to thereby obtain an optical low-pass filter effect, wherein at least one of the image sensor and a lens element constituting a portion of the photographing optical system constitutes the shake-correction member; a retriever which retrieves information on an aperture diameter of the diaphragm and information on a resolving power of the photographing lens; and a drive controller which varies a range of the pixels, which are mutually different in detection color and on which the object-emanating light rays are incident, in accordance with at least one of the information on the aperture diameter of the diaphragm and the information on the resolving power of the photographing lens that are retrieved by the retrieving portion to vary the optical low-pass filter effect, which is provided by the driver.

The drive controller varies the optical low-pass filter effect, which is provided by the driver, in accordance with the information on the aperture diameter of the diaphragm and the information on the resolving power of the photographing lens.

As the aperture diameter of the diaphragm that the retrieving portion retrieves increases, it is practical for the drive controller to enlarge the range of the pixels of the image sensor, on which the object-emanating light rays are incident, that are mutually different in detection color to enhance the optical low-pass filter effect that is provided by the driver. As the aperture diameter of the diaphragm that the retrieving portion retrieves decreases, it is practical for the drive controller to narrow the range of the pixels of the image sensor, on which the object-emanating light rays are incident, that are mutually different in detection color to weaken the optical low-pass filter effect that is provided by the driver.

As the resolving power of the photographing lens that the retrieving portion retrieves increases, the drive controller enlarges the range of the pixels of the image sensor, on which the object-emanating light rays are incident, that are mutually different in detection color to enhance the optical low-pass filter effect that is provided by the driver. As the resolving power of the photographing lens that the retrieving portion retrieves decreases, the drive controller narrows the range of the pixels of the image sensor, on which the object-emanating light rays are incident, that are mutually different in detection color to weaken the optical low-pass filter effect that is provided by the driver.

The drive controller does not drive the driver when a Rayleigh resolution limit which corresponds to the aperture diameter of the diaphragm that the retrieving portion retrieves is greater than pixel pitch of the image sensor, or when a Rayleigh resolution limit which corresponds to the resolving power of the photographing lens that the retrieving portion retrieves is greater than pixel pitch of the image sensor.

It is desirable for a low-pass filter operator to be further provided, for the driver to oscillate the image sensor along linear paths in two orthogonal directions that are parallel to alignment directions of the pixels of the image sensor which are orthogonal to each other, and for the low-pass filter operator to include a direction selection switch which is operated to make the image sensor oscillate only in one of the two orthogonal directions.

The driver includes a stage apparatus which includes a fixed support board; a movable stage to which the image sensor is fixed and which is slidable with respect to the fixed support board; a magnet which is fixed to a surface of the fixed support board which faces the movable stage; a yoke made of a magnetic material which is fixed to the fixed support board to face the magnet with the movable stage positioned between the yoke and the magnet to form a magnetic circuit between the yoke and the magnet; and a drive coil which is fixed to the movable stage and generates a driving force by receiving an electric current within a magnetic field of the magnetic circuit, wherein applying an AC voltage to the drive coil causes the movable stage to move.

The driver can move the image sensor along a circular path having a predetermined radius, and the drive controller can vary the predetermined radius to provide the optical low-pass filter effect.

The driver can move the image sensor along a square path, each side of which has a predetermined length, and the drive controller can vary the predetermined length to provide the optical low-pass filter effect.

Advantageous Effects of the Invention

According to the present invention, the low-pass filter effect is adjusted by oscillating the shake-correction member along a predetermined path according to at least one of information on the aperture diameter of a diaphragm contained in a photographing optical system and information on resolving power of the photographic lens, which makes it possible to appropriately prevent moiré and false color from occurring while preventing the resolving power and a sense of resolution from deteriorating.

EMBODIMENTS

Figure 1:
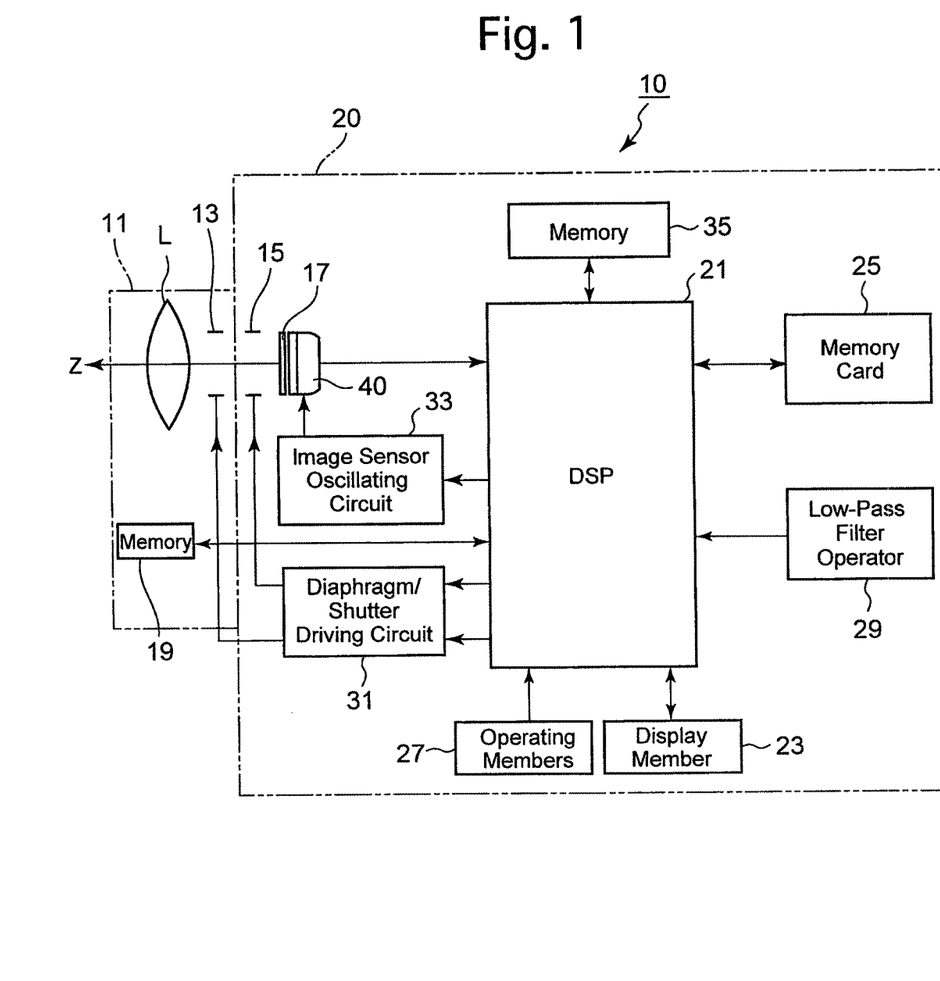
FIG. 1 is a diagram showing main components of an embodiment of a digital SLR camera according to the present invention.
Figure 2:
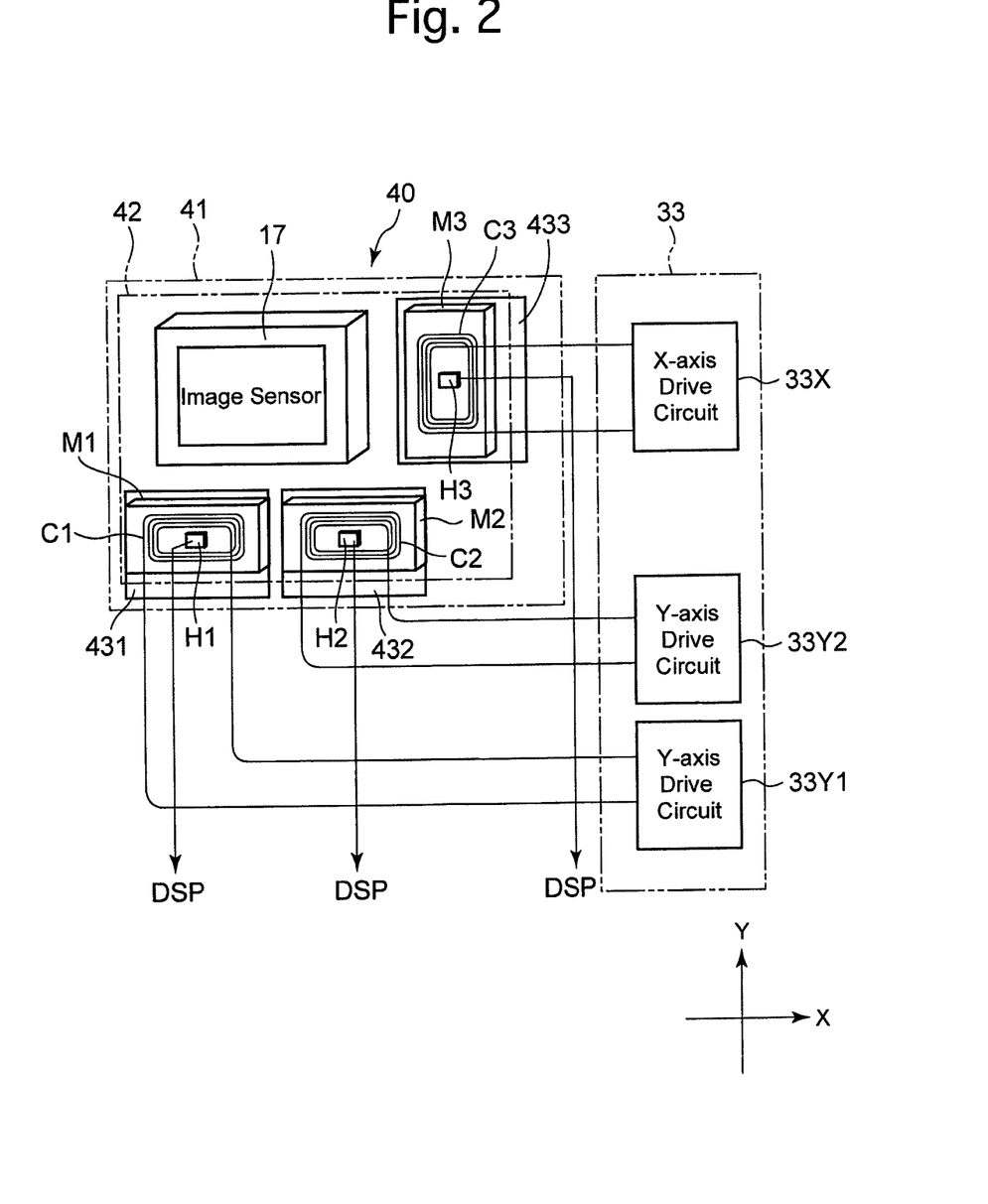
FIG. 2 is a block diagram showing main components of an embodiment of the digital SLR camera which is equipped with an image shake correcting apparatus.
Figure 3:
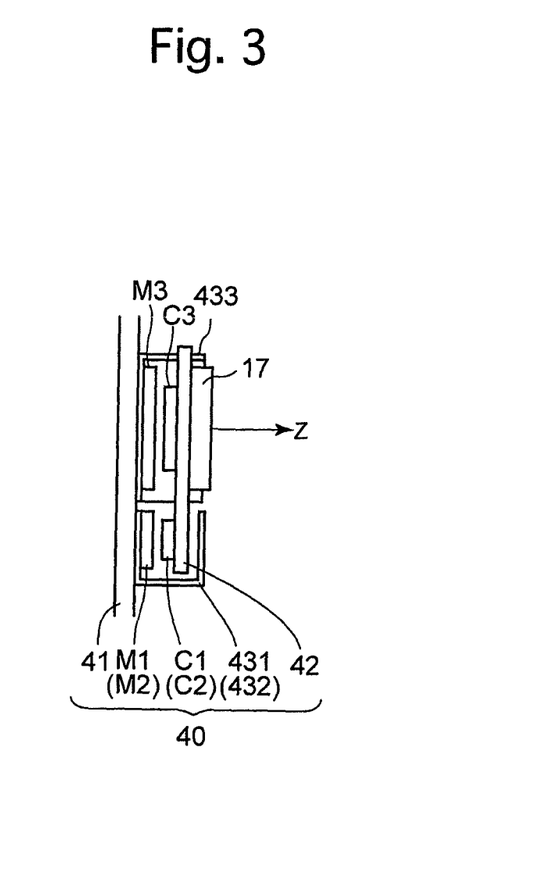
FIG. 3 is a side elevational view of the image shake correcting apparatus of the digital SLR camera.

A digital SLR camera (photographing apparatus) equipped with a photographing apparatus according to the present invention will be hereinafter discussed with reference to FIGS. 1 through 3. The digital SLR camera 10 is provided with a photographic lens 11 which is detachably attached to the camera body 20 of the digital SLR camera 10. The photographic lens 11 is provided with a photographing lens group L and a diaphragm 13, in that order from the object side (the left side with respect to the drawings), and the camera body 20 is provided with a shutter 15 and an image sensor (image pickup device) 17. An object image formed by object-emanating light rays, which enter from the photographing lens group L and pass through the diaphragm 13 and the fully-opened shutter 15, is formed on the image sensor 17 and is exposed. The object image thus formed on the image sensor 17 is converted into an electrical image signal using a large number of pixels arranged in a matrix, and this signal is output as an image signal to a DSP (CPU) 21. The DSP 21 performs a predetermined process on the image signal to display an image on a display member 23 and writes image data onto a memory card 25. The DSP 21 is connected to operating members 27, a low-pass filter operator 29, a diaphragm/shutter drive circuit 31, an image sensor oscillating circuit 33 and a memory 35. The operating members 27 include a power switch and a release switch, etc.; the low-pass filter operator 29 includes a switch to turn ON and OFF a low-pass filter operation, an adjusting switch to adjust the low-pass filter effect, and a direction selection switch to select the oscillating direction of the image sensor during the low-pass filter operation; a diaphragm/shutter drive circuit 31 is for driving and controlling the operations of the diaphragm 13 and the shutter 15, and data on the low-pass filter has been written into the memory 35. The photographic lens 11 incorporates a memory 19 which has stored therein information on the aperture diameter (aperture value) of the diaphragm 13 and information on the resolving power (MTF) of the photographing lens group L, and the DSP 21 reads this information. The photographing lens group L includes a plurality of lens groups with the diaphragm 13 generally positioned therebetween in the optical axis direction.

The image sensor 17 is mounted onto an image shake correcting apparatus 40 in a manner to be movable in an X-axis direction and a Y-axis direction (two orthogonal directions) which are orthogonal to an optical axis Z of the photographic lens 11. The image shake correcting apparatus 40 is provided with a stage apparatus which includes a fixed support board 41, a movable stage 42, magnets M1, M2 and M3, yokes 431, 432 and 433, and drive coils C1, C2 and C3. The fixed support board 41 is fixed to a structural member of the camera body 20 such as a chassis, the movable stage 42 is slidable relative to the fixed support board 41, the magnets M1, M2 and M3 are fixed to surfaces of the fixed support board 41 which face the movable stage 42; the yokes 431, 432 and 433 are made of a magnetic material and are fixed to the fixed support board 41 to face the magnets M1, M2 and M3 with the movable stage 42 positioned between the fixed support board 41 and the yokes 431, 432 and 433 to form a magnetic circuit between each yoke 431, 432 and 433 and the associated magnet M1, M2 or M3; and the drive coils C1, C2 and C3 are fixed to the movable stage 42 and each generate a driving force by receiving an electric current within the magnetic field of the aforementioned magnetic circuit. Applying an AC voltage to the drive coils C1, C2 and C3 from the image sensor oscillating circuit 33 causes the movable stage 42 to oscillate.

In this embodiment, a magnetic driver configured of the magnet M1, the yoke 431 and the drive coil C1, and a magnetic driver configured of the magnet M2, the yoke 432 and the drive coil C2 (i.e., two magnetic drivers) are arranged along the lengthwise direction of the image sensor 17 (horizontal direction/the X-axis direction) with a predetermined distance therebetween; and a magnetic driver (one magnetic driver) configured of the magnet M3, the yoke 433 and the drive coil C3 is arranged along the short side direction of the image sensor 17 that is orthogonal to the lengthwise direction of the image sensor 17 (perpendicular (orthogonal) direction/the Y-axis direction). The image sensor oscillating circuit 33 is provided with Y-axis drive circuits 33Y1 and 33Y2 and an X-axis drive circuit 33X which independently control currents supplied to the drive coils C1, C2 and C3, respectively.

Hall sensors H1, H2 and H3 which detect the magnetic forces of the magnets M1, M2 and M3 to detect the position of the movable stage 42 are arranged on the fixed support board 41 in the vicinity of (in the central hollow spaces of) the drive coils C1 through C3, respectively. The position in the Y-axis direction and the inclination (rotation) of the movable stage 42 are detected by the Hall sensors H1 and H2, and the position of the movable stage 42 in the X-axis direction is detected by the Hall sensor H3. The DSP 21 passes a driving current through each drive coil C1 through C3 via the Y-axis drive circuit 31Y1 and 31Y2 and the X-axis drive circuit 33X while detecting the position of the movable stage 42 from the outputs of the Hall sensors H1, H2 and H3 to move the movable stage 42 along a predetermined path and track at a predetermined speed (period). During image shake correcting operation, the DSP 21 detects vibrations of the digital SLR camera 10 using acceleration sensors (not shown) and controls the driving of the movable stage 42 (the image sensor 17) to reduce image shake via the image sensor oscillating circuit 33 in a manner to prevent the object image from moving relative to the image sensor 17.

The image sensor 17 of the present embodiment constitutes a shake-correction member, and the image sensor oscillating circuit 33 and the image shake correcting apparatus 40 constitute a driver which reproduces the effects of an optical low-pass (hereinafter referred to as an LPF effect) by driving the image sensor 17 in directions orthogonal to the optical axis Z of the photographic lens 11 via the movable stage 42. On the other hand, the DSP 21 constitutes a drive controller which drives the image shake correcting apparatus 40 via the image sensor oscillating circuit 33 to produce an LPF effect and further constitutes a retriever which retrieves information on the aperture diameter (aperture value) and information on the resolving power (MTF) of the photographing lens group L from the memory (lens information retaining portion) 19 of the photographic lens 11.

Figure 8:
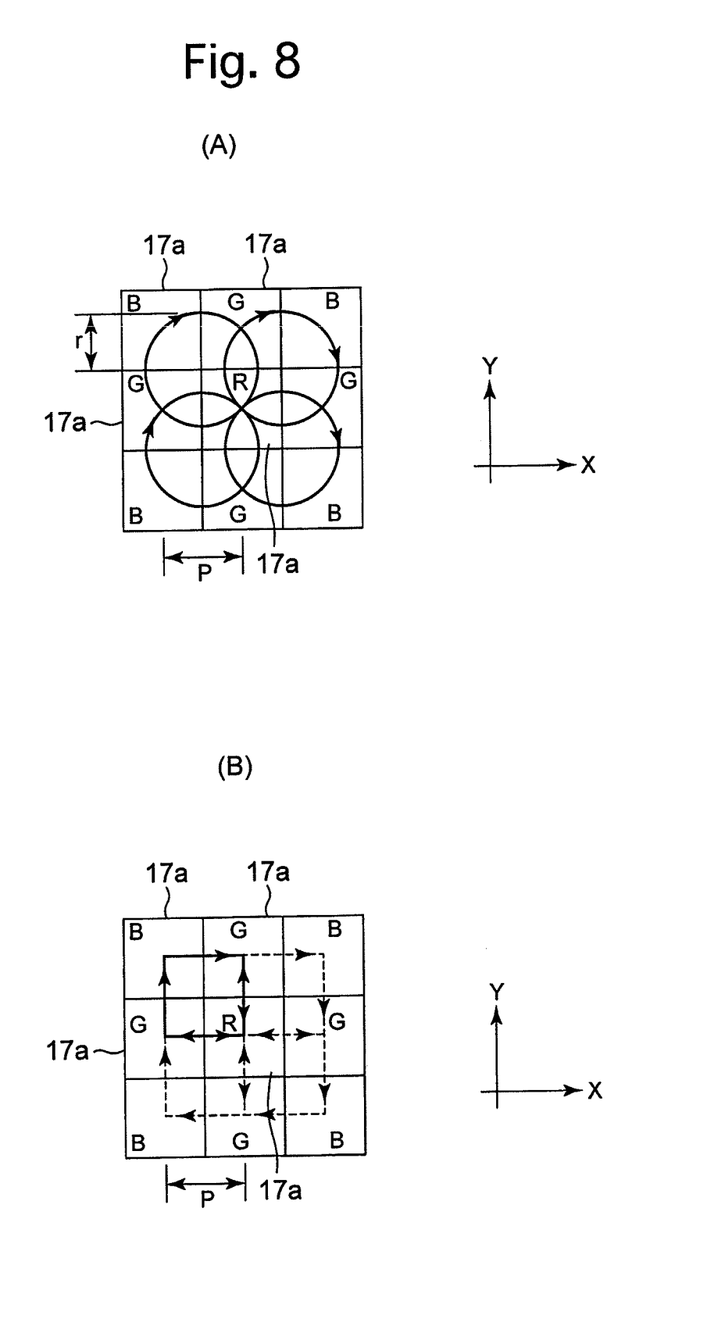
FIG. 8 shows graphs (A) and (B) showing different embodiments of the path of movement for an image sensor in an operation of the digital SLR camera which provides optical low-pass filter effect.

The aforementioned low-pass filter operation of the image shake correcting apparatus 40 that produces an LPF effect will be hereinafter discussed with reference to FIG. 8. FIGS. 8 (A) and (B) show different embodiments of the light receiving surface and the moving path of the image sensor 17. The image sensor 17 in each of these embodiments is provided with a large number of pixels 17a which are arranged in a matrix at a predetermined pixel pitch P on the light receiving surface, and one of color filters R, G and B arranged in Bayer pattern is positioned on the front surface of each pixel 17a. Each pixel 17a detects a color of object-emanating light rays which are incident on the pixel 17a after passing through the color filter R, G or B on the front surface thereof; specifically, the each pixel 17a converts light of the color component (color band) into an electrical signal and accumulates electric charge according to the intensity (brightness) of the light.

FIG. 8(A) shows an embodiment in which the image sensor 17 is driven to move along a circular closed path having a radius r of $2^{1/2}/2$ times the pixel pitch P. FIG. 8(B) shows an embodiment in which the image sensor 17 is driven to move along a square closed path, each side of which having a length equal to the pixel pitch P. In the embodiment shown in FIG. 8(B), the image sensor 17 is driven alternately in the Y-axis direction of the pixels 17a, which is parallel to one of mutually orthogonal alignment directions (perpendicular direction) of the pixels 17a, and in the X-axis direction of the pixels 17a, which is parallel to the other direction (horizontal direction), per unit of the pixel pitch P so that the image sensor 17 moves in a square closed path.

As described above, if the image sensor 17 is moved once around along the circular or square path during an exposure, since the object-emanating light rays (ray bundle) incident on the center of each color filter R, G and B (each pixel 17a) appear as if they are equally incident on four color filters R, G, B and G, the effect equivalent to that obtained using an optical low-pass filter is obtained. Namely, the light rays incident on any of the color filters R, G, B and G (the pixels 17a) are reliably incident on the peripheral color filters R, G, B and G (the peripheral pixels 17a), so that the effect (an LPF effect) equivalent to that obtained in the case where the light rays are passed through an optical low-pass filter is obtained.

Therefore, the LPF effect can be adjusted by changing the moving range and path of the image sensor 17, e.g., by varying the radius r in the case where the path is circular in shape or by varying the length (side length) of one side of the path in the case where the path is square in shape. Accordingly, the LPF effect is enhanced as the radius r of the circular path or the length of one side of the square path is increased (as the range of the pixels 17a (the color filters R, G, B and G) of the image sensor 17, on which object-emanating light rays are incident, which are mutually different in detection color is enlarged). On the other hand, the LPF effect is weakened as the radius r or the length of the one side is decreased (as the range of the pixels 17a (the color filters R, G, B and G) of the image sensor 17, on which object-emanating light rays are incident, which are mutually different in detection color is reduced). To obtain an appropriate LPF effect, the image sensor 17 should be moved around at least once, desirably by an integer number of times, along the circular or square path during an exposure.

In the digital SLR camera 10 according to the present invention, the DSP 21 retrieves information on the aperture value (aperture diameter) of the diaphragm 13 and information on the resolving power (MTF) of the photographing lens group L from the memory 19 of the photographic lens 11 in real time and adjusts the moving path of the image sensor 17 when taking a photograph according to information on the aperture value and the resolving power thus obtained to obtain appropriate LPF effect. This embodiment will be discussed hereinafter.

Specifically, in an embodiment according to the present invention, the digital SLR camera 10 retrieves the aperture value of the diaphragm 13 to adjust the LPF effect in order to produce an optimum LPF effect according to the aperture value of the diaphragm 13 when a picture is taken.

Figure 4:
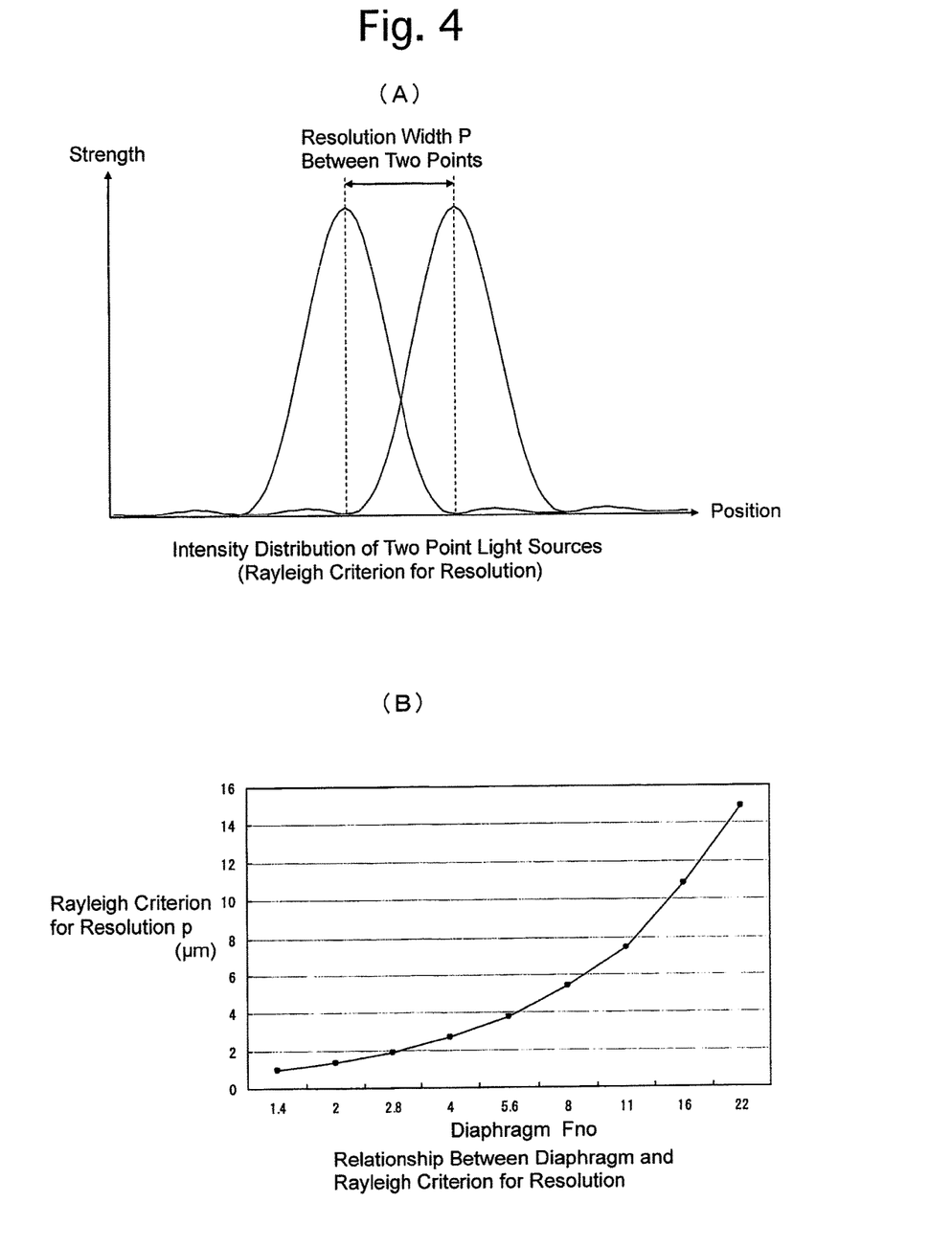
FIG. 4 shows diagrams for the digital SLR camera, wherein (A) is a graph illustrating the resolvable width between two point sources (Rayleigh resolution limit), and (B) is a graph illustrating the relationship between a diaphragm and Rayleigh resolution limit.

As the diaphragm is stopped down, the width of two point sources that can be resolved from each other as two points (Rayleigh resolution limit/the radius of an airy disk) widens due to the influence of diffraction, which consequently makes it impossible to resolve a narrow width, thus causing an object image to become blurred. This phenomenon can be considered to be equivalent to that caused by an LPF effect. FIG. 4(A) is a graph illustrating a state of the width of two point sources that can be resolved from each other. In this graph, the horizontal axis represents the position (distance) on the light receiving surface and the vertical axis represents the light intensity. The width of two point sources that can be resolved from each other as two points (resolution width p between the two points) becomes narrower as the bell curve of the light intensity of each point source is steeper, while the width of two point sources that can be resolved from each other as two points (resolution width p between the two points) becomes wider as the bell curve of the light intensity of each point source is more gentle. For instance, in the case where the pixel pitch P of the image sensor 17 of the digital SLR camera 10 is approximately 6 µm, object images with the pixel pitch of P become impossible to be resolved if the diaphragm 13 is stopped down to f8. FIG. 4(B) shows the relationship between the aperture value and the Rayleigh resolution limit (resolution width between two points) p. In FIG. 4(B), the horizontal axis designates f-number (Fno) of the diaphragm and the vertical axis designates the Rayleigh resolution limit (p (µm)).

As can be seen from this graph, this embodiment of the image sensor 17 needs no LPF when the diaphragm 13 is stopped down to a size equal to or smaller than f8. Accordingly, this embodiment of the digital SLR camera 10 turns OFF the low-pass filter operation of the image sensor oscillating circuit 33 and the image shake correcting apparatus 40 when the diaphragm 13 is stopped down to a size equal to or smaller than f8 or when the width of the Rayleigh resolution limit is equal to or smaller than 6 µm.

Figure 6:
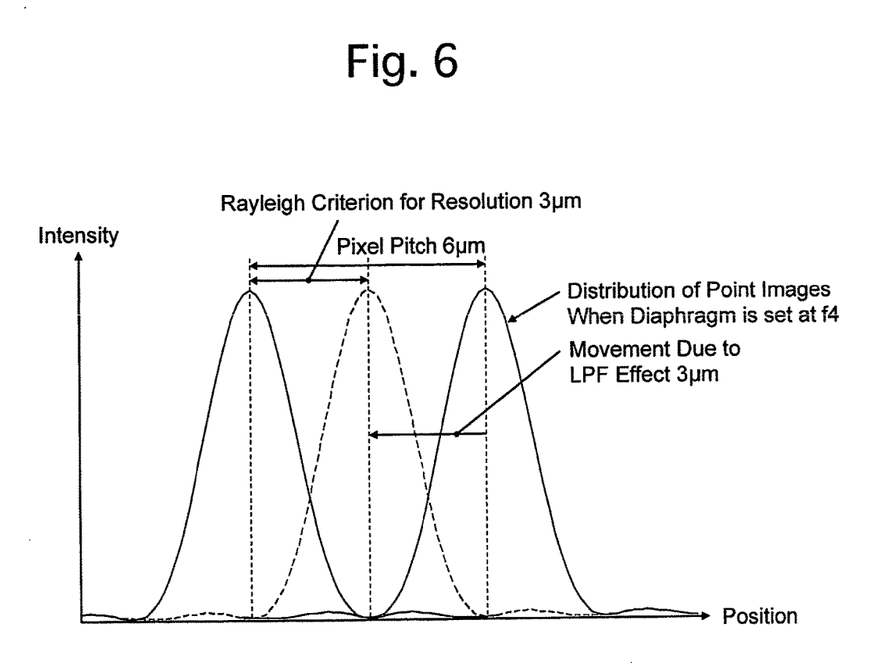
FIG. 6 is a graph illustrating, at times before and after a low-pass filter operation is performed, variations in intensity distribution of a point image at f4 in the digital SLR camera.

In addition, when photographing with the diaphragm 13 set at f4, this embodiment of the digital SLR camera 10 cannot resolve small images having a size which is equal to or smaller than 3 µm due to the influence of diffraction (FIG. 4(B), FIG. 6). In this case, a movement of the image sensor 17 by an amplitude of 3 µm, corresponding to half the pixel pitch P, in the low-pass filter operation corresponds to the Rayleigh resolution limit of 3 µm, so that sufficient LPF effect is obtained (FIG. 6). In this case, if the image sensor 17 is moved by an amplitude of 6 µm in the low-pass filter operation, the image sensor would move beyond the Rayleigh resolution limit, which results in the LPF effect being excessively strong. This embodiment of the digital SLR camera 10 produces an appropriate LPF effect according to the influence of diffraction caused by the diaphragm 13, and prevents a sense of resolution from deteriorating to achieve a high sense of resolution while preventing moiré and false color from occurring.

As described above, in this embodiment, an appropriate LPF effect is obtained by setting the length (radius r) of one side of the moving path of the image sensor 17 according to the aperture value set by the DSP 21 and the pixel pitch P of the image sensor 17, moving the image sensor 17 along the square (or circular) path (the low-pass filter operation) using the image sensor oscillating circuit 33 and the image shake correcting apparatus 40, and turning OFF the image sensor oscillating circuit 33.

The amount of movement of the image sensor 17 in the low-pass filter operation does not necessarily need to be set at the Rayleigh resolution limit; however, the degree of LPF effect can be controlled by setting the amount of movement of the image sensor 17 to be greater or smaller than the Rayleigh resolution limit. In addition, the amount of movement defined by the Rayleigh resolution limit cannot be said to be a condition to obtain sufficient LPF effect, and since the capability of sharing a ray of light between R, GR, GB and B pixels becomes a condition to obtain a sufficient LPF effect, sometimes a sufficient LPF effect cannot be obtained (the LPF effect is weak) with an amount of movement of the image sensor 17 that is smaller than the Rayleigh resolution limit.

Figure 5:
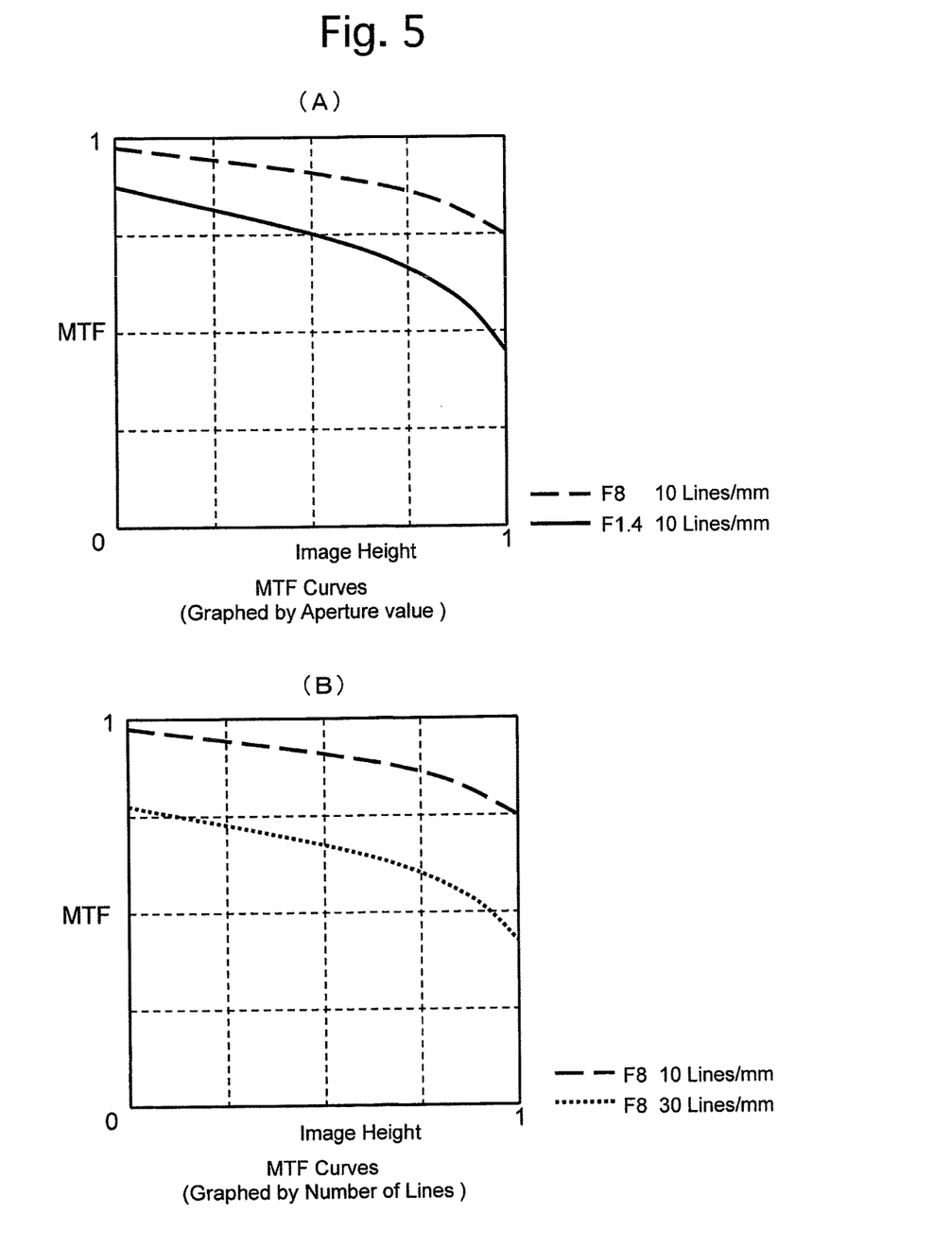
FIG. 5 shows graphs illustrating the resolving power (MTF) of the photographic lens of the digital SLR camera, wherein (A) is a graph illustrating the relationship between the aperture value and the resolving power (MTF) at the same frequency, and (B) is a graph illustrating the relationship between the spatial frequency and the resolving power at the same aperture value.

In addition, in another embodiment of the digital SLR camera according to the present invention, the LPF effect is adjusted according to the resolving power of the photographic lens 11 when a photograph is taken in order to produce an appropriate LPF effect according to the resolving power (MTF) of the photographic lens 11. FIG. 5(A) is a graph illustrating a state of the resolution power (MTF) that varies according to the aperture value at the same spatial frequency and FIG. 5(B) is a graph illustrating a state of the resolution power (MTF) that varies according to the aperture value at the same aperture value. FIGS. 7(A), (B) and (C) are graphs illustrating the difference between image forming states due to the difference in resolving power (MTF).

When the pixel pitch of the image sensor 17 is great with respect to the resolving power (MTF) of the photographic lens 11 (when the resolving power (MTF) is relatively high), it is desirable to obtain a sufficient LPF effect performing the low-pass filter operation in a manner to achieve a strong LPF effect. On the other hand, when the pixel pitch is small (when the resolving power (MTF) is relatively low), it is possible to obtain a sufficient LPF effect even with a low-pass filter operation that has a weak LPF effect. If the LPF effect is enhanced when the resolving power (MTF) is low, the resolving power deteriorates, which causes a reduction in sense of resolution. In this embodiment, the LPF effect is adjusted by adjusting the low-pass filter operation of the image sensor oscillating circuit 33 and the image shake correcting apparatus 40 according to the resolving power (MTF) of the photographic lens 11 and preventing unnecessary deterioration of a sense of resolution from occurring while preventing moiré and false color from occurring, which makes it possible to achieve a high sense of resolution at all times.

In the above described embodiments, the case where the DSP 21 makes the image sensor oscillating circuit 33 and the image shake correcting apparatus 40 perform the low-pass filter operation using one of the aperture value of the diaphragm 13 and the resolving power of the photographing lens group L has been illustrated by way of example. The DSP 21 in another embodiment makes the image sensor oscillating circuit 33 and the image shake correcting apparatus 40 perform the low-pass filter operation using both the aperture value of the diaphragm 13 and the resolving power of the photographing lens group L.

The resolving power of photographic lenses vary depending on the photographic lens model; however, in many photographic lenses, the resolving power is most enhanced when the diaphragm is slightly stopped down from full-open aperture. As shown in FIG. 5(A), the MTF generally increases as the opening of the diaphragm is reduced. However, although the MTF increases as the opening of the diaphragm is reduced, diffraction also occurs due to the influence of the diaphragm, so that stopping down the diaphragm more than a certain amount causes a decrease in the MTF. In addition, MTF varies according to the spatial frequency of an object, and the higher the spatial frequency of an object, the lower the MTF is (FIG. 5(B)). Taking the LPF effect into account, the LPF effect does not have to be made strong in the lens which is low in MTF at high frequency. For instance, in the case where the pixel pitch of the image sensor 17 is 6 μm, when a photographic lens with 80 percent of MTF at a spatial frequency of 170 lp/mm corresponding to the resolution limit of the image sensor 17 and a photographic lens with 20 percent of the same MTF are compared with each other, the LPF effect can be weakened in the photographic lens with 20 percent MTF because the contrast drops to 20 percent at a spatial frequency close to the pixel pitch, whereas the LPF effect needs to be made sufficiently strong in the photographic lens with 80 percent MTF because the contrast is sufficient at a spatial frequency close to the pixel pitch.

Figure 7:
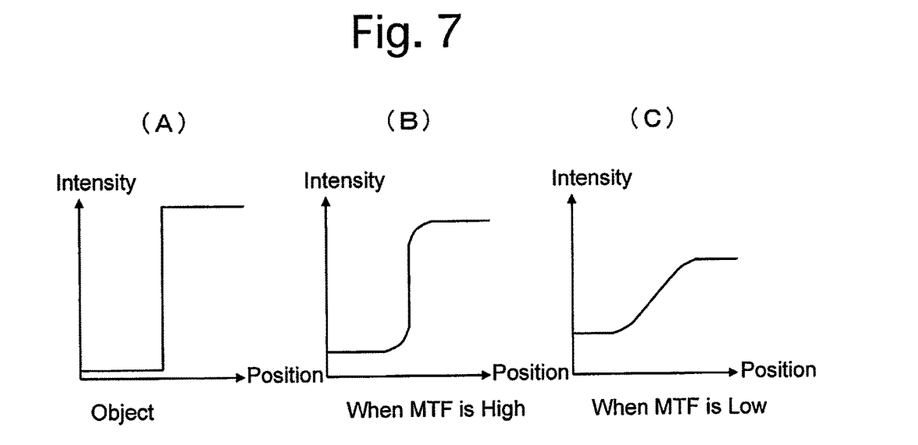
FIG. 7 shows graphs illustrating the difference between image forming states due to differences of resolving power (MTF), wherein (A) is a graph illustrating the intensity distribution of an object, (B) is a graph illustrating the intensity distribution of the object in the case where resolving power (MTF) is high, and (C) is a graph illustrating the intensity distribution of the object in the case where resolving power (MTF) is low.

Taking the relationship between the aforementioned spatial frequency and MTF, and the diaphragm into consideration at the same time, the influence of diffraction due to the diaphragm is small in the case of a photographic lens with an MTF of, e.g., approximately 20 percent, so that it is desirable to weaken the LPF effect regardless of aperture value. On the other hand, in a photographing lens with, e.g., 80 percent of MTF, the influence of diffraction due to the diaphragm is generally great. Accordingly, control to weaken the LPF effect is desirable when the resolving power is reduced due to the influence of diffraction caused by a stop-down operation. If the low-pass filter operation is controlled with consideration given solely to the influence of a diaphragm with no consideration given to MTF, the LPF effect results in being enhanced even in the case of a photographic lens with 20 percent MTF, which causes a decrease in sense of resolution. Although the influence of diffraction due to a diaphragm also appears in the MTF characteristics, the MTF exerts an influence on the contrast ratio and is a characteristic which does not tie in directly with spread of a point image, unlike diffraction (FIGS. 6 and 7). Accordingly, in another embodiment according to the present invention, the LPF effect can be finely controlled by using MTF and aperture value at the same time.

Additionally, in this embodiment of the digital SLR camera 10, the LPF effect can be turned ON and OFF by the user manually operating the low-pass filter operator 29. In addition, whether to give priority to a sense of resolution or the elimination of influences such as false color and moiré can be selected by carrying out the LPF effect level setting in accordance with the difference among objects and expressions of objects. For instance, it is also possible to turn OFF the low-pass filter operation of the image sensor oscillating circuit 33 and the image shake correcting apparatus 40 when false color and moiré are negligible because adding an LPF effect causes a reduction in sense of resolution, to turn ON the low-pass filter operation of the image sensor oscillating circuit 33 and the image shake correcting apparatus 40 when the occurrence of false color and moiré is troublesome even if a sense of resolution deteriorates, and to freely manually adjust the degree of effectiveness of LPF effect when the user desires to reduce false color and moiré though desiring a sense of resolution.

Additionally, in this embodiment of the digital SLR camera 10, upon the user manually operating the low-pass filter operator 29, it is possible to add LPF effect by oscillating (moving) the image sensor 17 only in the horizontal direction by the image sensor oscillating circuit 33 and the image shake correcting apparatus 40 when an object image is like a horizontally repeating pattern, and to add an LPF effect by oscillating (moving) the image sensor 17 only in the vertical direction by the image sensor oscillating circuit 33 and the image shake correcting apparatus 40 when an object image is like a vertically repeating pattern, so that it is possible to set LPF effect flexibly and to maintain a high sense of resolution while preventing moiré and false color from occurring by giving minimum LPF effect.

Although the above described digital SLR camera 10 is a lens-interchangeable camera in which the photographic lens 11 is detachably attached to the camera body, and although the photographing lens group L becomes integral with the camera body, the present invention can also be applied to a digital camera in which a photographic lens is an integral part of a camera body. In this case, data on the resolving power of the photographic lens and data on the diaphragm, which are necessary to obtain an LPF effect, are written into the memory 35 of the camera body 20 in advance.

Additionally, in this embodiment of the digital SLR camera 10, variations in focal length cause the open aperture or resolving power to vary if the photographic lens is a zoom lens, so that the image sensor oscillating circuit 33 and the image shake correcting apparatus 40 are actuated to perform the low-pass filter operation so that an appropriate LPF effect can be obtained by inputting information on the open aperture and information on the resolving power from the zoom lens during a photographing operation.

In the above described embodiment, the case where the DSP 21 makes the image sensor oscillating circuit 33 and the image shake correcting apparatus 40 perform the low-pass filter operation using one of the aperture value of the diaphragm 13 and the resolving power of the photographing lens group L has been illustrated. The DSP 21 may control the low-pass filter operation, which is performed by the image sensor oscillating circuit 33 and the image shake correcting apparatus 40, using both the aperture value of the diaphragm 13 and the resolving power of the photographing lens group L.

Although the image sensor 17 is used as a shake-correction member in the above illustrated embodiment, one of the lens elements which constitutes part of the photographic lens 11 can be used as the shake-correction member instead; in this case, the following modified embodiment is also possible: the optical low-pass filter effect is obtained by making object-emanating light rays incident on a plurality of pixels of the image sensor which are mutually different in detection color by driving the aforementioned one lens element in a plane orthogonal to the optical axis of the photographic lens 11.

INDUSTRIAL APPLICABILITY

The photographing apparatus according to the present invention is capable of obtaining an appropriate optical low-pass filter effect according to photographic conditions without the use of an optical low-pass filter because the low-pass filter effect is adjusted by oscillating the image sensor along a predetermined path in a plane orthogonal to the optical axis of a photographing optical system according to at least one of information on the aperture diameter of a diaphragm of the photographing optical system and information on resolving power of the photographic lens. Accordingly, the present invention can be widely applied to digital cameras.

REFERENCE SIGNS LIST

10 Digital SLR camera (Camera body)
11 Photographic lens (Photographing optical system/Interchangeable lens/Shake-correction member)
L Photographing lens group (Photographing optical system)
13 Diaphragm (Photographing optical system)
15 Shutter
17 Image sensor (Shake-correction member)
17a Pixel
19 Memory (Lens information retaining portion)
20 Camera body
21 DSP (Drive controller/Retriever)
23 Display member
27 Operating member
29 Low-pass filter operator
33 Image sensor oscillating circuit (Driver)
33X X-axis drive circuit
33Y1 33Y2 Y-axis drive circuit
40 Image shake correcting apparatus (Driver)
41 Fixed support board
42 Movable stage
431 432 433 Yoke
C1 C2 C3 Drive coil
H1 H2 H3 Hall sensor
M1 M2 M3 Magnet
R G B Color filter

The invention claimed is:

1. A photographing apparatus comprising:
a photographing optical system having a diaphragm and a photographing lens;
an image sensor, to which an object image that is formed from object-emanating light rays that have passed through said photographing optical system is exposed,
a driver configured to drive a shake-correction member in a plane intersecting an optical axis of said photographing optical system to make said object-emanating light rays incident on a plurality of pixels of said image sensor which are mutually different in detection color,
wherein at least one of said image sensor and a lens element constituting a portion of said photographing optical system constitutes said shake-correction member;
a retriever configured to retrieve information on an aperture diameter of said diaphragm and information on a resolving power of said photographing lens; and
a drive controller configured to drive said shake correction member along a predetermined path, in accordance with at least one of said information on said aperture diameter of said diaphragm and said information on said resolving power of said photographing lens that are retrieved by retriever.

2. The photographing apparatus according to claim 1, wherein said drive controller is configured to vary said predetermined path, in accordance with said information on said aperture diameter of said diaphragm and said information on said resolving power of said photographing lens, which are provided by said retriever.

3. The photographing apparatus according to claim 1, wherein, as said resolving power of said photographing lens that said retriever retrieves increases, said drive controller enlarges a range of said pixels of said image sensor, on which said object-emanating light rays are incident, and as said resolving power of said photographing lens that said retriever retrieves decreases, said drive controller narrows said range of said pixels of said image sensor, on which said object-emanating light rays are incident.

4. The photographing apparatus according to claim 3, wherein said drive controller does not drive said driver when a Rayleigh resolution limit which corresponds to said resolving power of said photographing lens that said retriever retrieves is greater than a pixel pitch of said image sensor.

5. The photographing apparatus according to claim 1, further comprising a low-pass filter operator,
wherein said driver can oscillate said image sensor along linear paths in two orthogonal directions that are parallel to alignment directions of said pixels of said image sensor which are orthogonal to each other, and wherein said low-pass filter operator comprises a direction selection switch which is operated to make said image sensor oscillate only in one of said two orthogonal directions.

6. The photographing apparatus according to claim 1, wherein said driver comprises a stage apparatus which includes:
a fixed support board;
a movable stage to which said image sensor is fixed and which is slidable with respect to said fixed support board;
a magnet which is fixed to a surface of said fixed support board which faces said movable stage;
a yoke of a magnetic material which is fixed to said fixed support board to face said magnet with said movable stage positioned between said yoke and said magnet to form a magnetic circuit between said yoke and said magnet; and
a drive coil which is fixed to said movable stage and generates a driving force by receiving an electric current within a magnetic field of said magnetic circuit,
wherein applying an AC voltage to said drive coil causes said movable stage to move.

7. The photographing apparatus according to claim 6, wherein said stage apparatus comprises a magnetic driver which includes more than one of said magnet, more than one of said yoke, and more than one of said coil which move said movable stage independently in two orthogonal directions parallel to alignment directions of said pixels of said image sensor which are orthogonal to each other.

8. The photographing apparatus according to claim 1, wherein said driver moves said image sensor along a circular path having a predetermined radius, and
said drive controller is configured to vary the predetermined radius of said circular path.

9. The photographing apparatus according to claim 1, wherein said driver moves said image sensor along a square path, each side of which has a predetermined length, and
said drive controller is configured to vary said predetermined length of said square path.

10. A photographing apparatus comprising:
a photographing optical system having a diaphragm and a photographing lens;
an image sensor, to which an object image that is formed from object-emanating light rays that have passed through said photographing optical system is exposed;
a driver configured to drive a shake-correction member in a plane intersecting an optical axis of said photographing optical system to make said object-emanating light rays incident on a plurality of pixels of said image sensor which are mutually different in detection color, wherein at least one of said image sensor and a lens element constituting a portion of said photographing optical system constitutes said shake-correction member;
a retriever configured to retrieve information on an aperture diameter of said diaphragm and information on a resolving power of said photographing lens; and
a drive controller configured to vary a range of said pixels, which are mutually different in detection color and on which said object-emanating light rays are incident, in accordance with at least one of said information on said aperture diameter of said diaphragm and said information on said resolving power of said photographing lens that are retrieved by said retriever,
wherein, as said aperture diameter of said diaphragm that said retriever retrieves increases, said drive controller enlarges said range of said pixels of said image sensor, on which said object-emanating light rays are incident, and
as said aperture diameter of said diaphragm that said retriever retrieves decreases, said drive controller narrows said range of said pixels of said image sensor, on which said object-emanating light rays are incident.

11. The photographing apparatus according to claim 10, wherein said drive controller does not drive said driver when a Rayleigh resolution limit which corresponds to said aperture diameter of said diaphragm that said retriever retrieves is greater than a pixel pitch of said image sensor.

12. The photographing apparatus according to claim 10, wherein said driver moves said image sensor along a circular path having a predetermined radius, and
said drive controller is configured to vary the predetermined radius of said circular path.

13. The photographing apparatus according to claim 10, wherein said driver moves said image sensor along a square path, each side of which has a predetermined length, and
said drive controller is configured to vary said predetermined length of said square path.

14. A photographing apparatus comprising:
a photographing optical system having at least a diaphragm and a photographing lens;
an image sensor, to which an object image that is formed from object-emanating light rays passed through said photographing optical system is exposed, and which converts said object image thus exposed into an electrical pixel signal;
a driver which drives a shake-correction member in a plane orthogonal to an optical axis of said photographing optical system to make said object-emanating light rays incident on a plurality of pixels of said image sensor which are mutually different in detection color to thereby obtain an optical low-pass filter effect, wherein at least one of said image sensor and a lens element constituting a portion of said photographing optical system constitutes said shake-correction member;
a retriever which retrieves information on an aperture diameter of said diaphragm and information on a resolving power of said photographing lens; and
a drive controller which varies a range of said pixels, which are mutually different in detection color and on which said object-emanating light rays are incident, in accordance with at least one of said information on said aperture diameter of said diaphragm and said information on said resolving power of said photographing lens that are retrieved by said retrieving portion to vary said optical low-pass filter effect, which is provided by said driver,
wherein said driver can oscillate said image sensor along linear paths in two orthogonal directions that are parallel to alignment directions of said pixels of said image sensor which are orthogonal to each other, and wherein said low-pass filter operator comprises a direction selection switch which is operated to make said image sensor oscillate only in one of said two orthogonal directions.

15. The photographing apparatus according to claim 14, wherein said driver comprises a stage apparatus which includes:
a fixed support board;
a movable stage to which said image sensor is fixed and which is slidable with respect to said fixed support board;
a magnet which is fixed to a surface of said fixed support board which faces said movable stage;
a yoke of a magnetic material which is fixed to said fixed support board to face said magnet with said movable stage positioned between said yoke and said magnet to form a magnetic circuit between said yoke and said magnet; and
a drive coil which is fixed to said movable stage and generates a driving force by receiving an electric current within a magnetic field of said magnetic circuit,
wherein applying an AC voltage to said drive coil causes said movable stage to move.

16. The photographing apparatus according to claim 15, wherein said stage apparatus comprises a magnetic driver which includes more than one of said magnet, more than one of said yoke, and more than one of said coil which move said movable stage independently in two orthogonal directions parallel to alignment directions of said pixels of said image sensor which are orthogonal to each other.

17. The photographing apparatus according to claim 14, wherein said driver moves said image sensor along a circular path having a predetermined radius, and
wherein said drive controller varies said predetermined radius to provide said optical low-pass filter effect.

18. The photographing apparatus according to claim 14, wherein said driver moves said image sensor along a square path, each side of which has a predetermined length, and wherein said drive controller varies said predetermined length to provide said optical low-pass filter effect.

19. The photographing apparatus according to claim 14, wherein, as said aperture diameter of said diaphragm that said retriever retrieves increases, said drive controller enlarges said range of said pixels of said image sensor, on which said object-emanating light rays are incident, that are mutually different in detection color to enhance said optical low-pass filter effect that is provided by said driver, and wherein, as said aperture diameter of said diaphragm that said retriever retrieves decreases, said drive controller narrows said range of said pixels of said image sensor, on which said object-emanating light rays are incident, that are mutually different in detection color to weaken said optical low-pass filter effect that is provided by said driver.

20. The photographing apparatus according to claim 14, wherein, as said resolving power of said photographing lens that said retrieving portion retrieves increases, said drive controller enlarges said range of said pixels of said image sensor, on which said object-emanating light rays are incident, that are mutually different in detection color to enhance said optical low-pass filter effect that is provided by said driver, and wherein, as said resolving power of said photographing lens that said retriever retrieves decreases, said drive controller narrows said range of said pixels of said image sensor, on which said object-emanating light rays are incident, that are mutually different in detection color to weaken said optical low-pass filter effect that is provided by said driver.

* * * * *